United States Patent [19]

Kuroda

[11] Patent Number: 5,299,079
[45] Date of Patent: Mar. 29, 1994

[54] FLYING HEAD SLIDER WITH CONTROL GROOVES TO ESTABLISH A UNIFORM FLYING HEIGHT

[75] Inventor: Masayuki Kuroda, Kanagawa, Japan
[73] Assignee: Sony Corporation, Tokyo, Japan
[21] Appl. No.: 876,750
[22] Filed: Apr. 29, 1992

[30] Foreign Application Priority Data

May 20, 1991 [JP] Japan ................... 3-142624

[51] Int. Cl.⁵ .............................. G11B 5/60
[52] U.S. Cl. .................................. 360/103
[58] Field of Search ................. 360/103–104, 360/102

[56] References Cited

U.S. PATENT DOCUMENTS

| | | | |
|---|---|---|---|
| 4,673,996 | 6/1987 | White | 360/103 |
| 4,870,519 | 9/1989 | White | 360/103 |
| 5,016,129 | 5/1991 | Goto et al. | 360/103 |
| 5,136,445 | 8/1992 | Zak | 360/103 |

FOREIGN PATENT DOCUMENTS 0255883  10/1988  Japan ................... 360/103

*Primary Examiner*—A. J. Heinz
*Assistant Examiner*—Brian E. Miller
*Attorney, Agent, or Firm*—William S. Frommer; Alvin Sinderbrand

[57] ABSTRACT

A flying head slider for use in a hard disk drive includes a slider body having pair of parallel slider rails spaced from each other with a slider groove defined therebetween. A magnetic head is supported on one of the slider rails. The slider body also has a pair of control grooves disposed on one side of the slider rails, respectively, and extending therealong. The control grooves are shallower than the slider groove. The flying head slider floats off the surface of a hard disk stably by a low height over an entire disk surface range.

1 Claim, 6 Drawing Sheets

FLYING HEAD SLIDER WITH CONTROL GROOVES TO ESTABLISH A UNIFORM FLYING HEIGHT

BACKGROUND OF THE INVENTION

1. Field of the Invention

The present invention relates to a flying head slider for use in a hard disk drive of the swing arm type.

2. Description of the Prior Art

FIGS. 1 and 2 of the accompanying drawings show a hard disk drive of the swing arm type.

As shown in FIGS. 1 and 2, a plurality of vertically spaced magnetic hard disks 2 are mounted on a vertical spindle 1 of a spindle motor (not shown) so that the hard disks 2 can be rotated at a high speed of 3,600 rpm, for example, in the direction indicated by the arrow a (FIG. 1). A plurality of swing actuator arms 4 are swingably mounted on an arm shaft 3. Specifically, the actuator arms 4 comprise respective arms 6 attached to the outer circumference of a boss 5 disposed around the arm shaft 3, and respective suspensions 7 in the form of leaf springs attached respectively to the distal ends of the arms 6. A plurality of flying head sliders 8 are mounted respectively on the distal ends of the suspensions 7. A voice coil attachment arm 9 is mounted on the outer circumference of the boss 5 remotely from the arms 6. The voice coil attachment arm 9 can be angularly moved by a voice coil motor (not shown) to turn the actuator arms 4 and hence the flying head sliders 8 in the directions indicated by the arrows b, c (FIG. 1).

When the hard disks 2 rotate at high speed in the direction a, air flows are developed in the direction a on the surfaces of the hard disks 2 and applied to cause the flying head sliders 8 to float off the surfaces of the hard disks 2 by a slight distance in the order of submicrons against the resiliency of the suspensions 7. While the hard disks 2 are thus rotating, signals can be recorded on or reproduced from the hard disks 2 by magnetic heads on the flying head sliders 8.

The flying head sliders 8 are generally of a dual-rail configuration shown in FIG. 3 of the accompanying drawings, as disclosed in Japanese laid-open patent publication No. 61-57087, for example.

As shown in FIG. 3, the flying head slider 8 includes a slider body 11 having a pair of parallel slider rails 12 on its lower surface which confronts a hard disk 2, with a slider groove 13 being defined between the slider rails 12. The slider rails 12 have lower slider surfaces 14, respectively. A magnetic head 15 is mounted on one of the slider rails 12 so as to lie substantially flush with the slider surface 14 thereof. Each of the slider rails 12 has a pair of slanted surfaces 16, 17 on the opposite ends of the slider surface 14. When the air flow is produced in the direction a and applied to the flying head slider 8 upon high-speed rotation of the hard disk 2, a static pressure is developed on the slider surfaces 14, forcing the slider surfaces 14 and the magnetic head 15 off the surface of the hard disk 2 by a slight distance in the order of submicrons.

The yaw angle of each of the flying head sliders 8 with respect to the air flow in the direction a is selected to be 0° at a radially innermost disk region ID and $\alpha°$ at a radially outermost disk region OD, as shown in FIG. 1. When the flying head slider 8 swings for accessing movement in the direction c from the radially innermost disk region ID toward the radially outermost disk region OD, the distance or height by which the flying head slider 8 floats off the hard disk 2 tends to increase easily. This is because the static pressure developed on the slider surfaces 14 increases at a higher rate in proportion to the linear velocity of the air flow which is maximum at the radially outermost disk region OD than it decreases due to the change of the yaw angle from 0° to $\alpha°$.

Heretofore, it has been impossible to keep the flying head slider 8 floating off the surface of the hard disk 2 by a small distance of about 0.1 $\mu$m over a full disk surface range from the radially innermost disk region ID to the radially outermost disk region OD. In the vicinity of the radially outermost disk region OD, the distance by which the flying head slider 8 floats off the hard disk 2 is 0.2 $\mu$m or greater, resulting in a large spacing loss which makes it difficult to effect high-density recording of signals on the hard disk 2.

OBJECTS AND SUMMARY OF THE INVENTION

In view of the aforesaid drawbacks of the conventional flying head slider, it is an object of the present invention to provide a flying head slider which is effective to reduce an increase, proportional to the linear velocity of an air flow, in the distance by which the flying head slider floats off a hard disk, based on a change in the yaw angle of the flying head slider.

According to the present invention, there is provided a flying head slider for supporting a magnetic head thereon, comprising a plurality of slider rails spaced from each other with a slider groove defined therebetween, one of the slider rails being adapted to support the magnetic head, and a plurality of control grooves disposed on one side of the slider rails, respectively, and extending therealong, the control grooves being shallower than the slider groove.

During high-speed rotation of a hard disk associated with the flying head slider, an air flow is produced and applied to the flying head slider. As the flying head slider moves radially from a radially innermost disk region to a radially outermost disk region of the rotating hard disk, the yaw angle of the flying head slider progressively increases, and the direction of the air flow varies. When the linear velocity of the air flow progressively increases, a negative pressure is developed in the control grooves in proportion to the linear velocity. An increase, proportional to the linear velocity of the air flow, in the distance or height by which the flying head slider floats off the disk surface, is effectively reduced based on the change in the yaw angle of the flying head slider. Consequently, the flying head slider remains floating off the disk surface stably by a small distance over the full disk surface range.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 4:
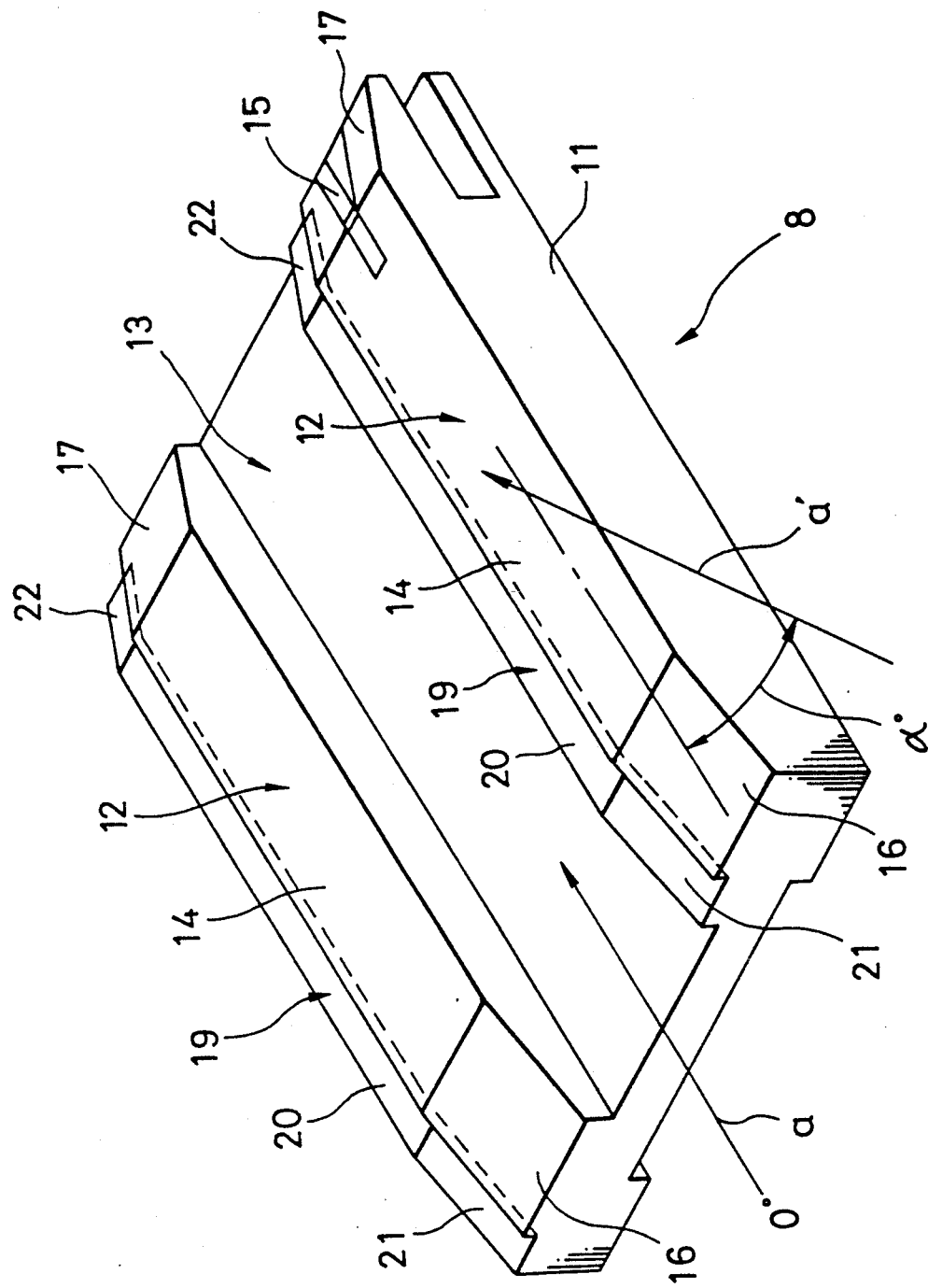
FIG. 4 is a perspective view of a flying head slider according to the present invention.

A flying head slider according to the present invention is particularly suitable for use in a hard disk drive. As shown in FIG. 4, the flying head slider, generally designated by the reference numeral 8, includes a slider body 11 having a pair of parallel slider rails 12 on its lower surface which confronts a hard disk, with a slider groove 13 being defined between the slider rails 12. The slider rails 12 have lower slider surfaces 14, respectively. A magnetic head 15 is mounted on one of the slider rails 12 so as to lie substantially flush with the slider surface 14 thereof. Each of the slider rails 12 has a pair of slanted surfaces 16, 17 on the opposite ends of the slider surface 14. When the air flow is produced in the direction a and applied to the flying head slider 8 upon high-speed rotation of the hard disk 2, a static pressure is developed on the slider surfaces 14, forcing the slider surfaces 14 and the magnetic head 15 off the surface of the hard disk.

The flying head slider 8 also has control grooves 19 defined in the slider body 11 and disposed on one side of the slider rails 12, respectively, and extending therealong, the control grooves 19 being shallower than the slider groove 18. The control grooves 19 have respective bottom slider surfaces 20 extending parallel to the slider surfaces 14, and slanted surfaces 21, 22 on the opposite ends of the slider surfaces 20, the slanted surfaces 21, 22 lying parallel to the slanted surfaces 16, 17.

Figure 5A:
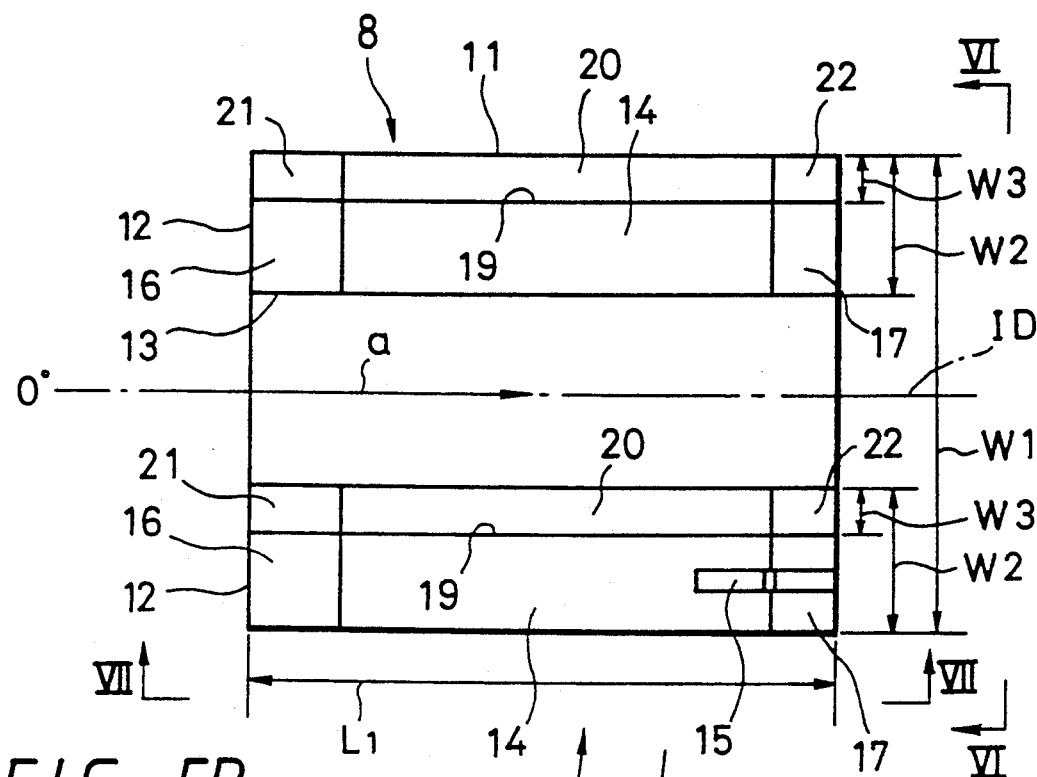
FIG. 5a-b are plan views of the flying head slider shown in FIG. 4 at different radial positions relative to the disk of the hard disk drive.
Figure 6:
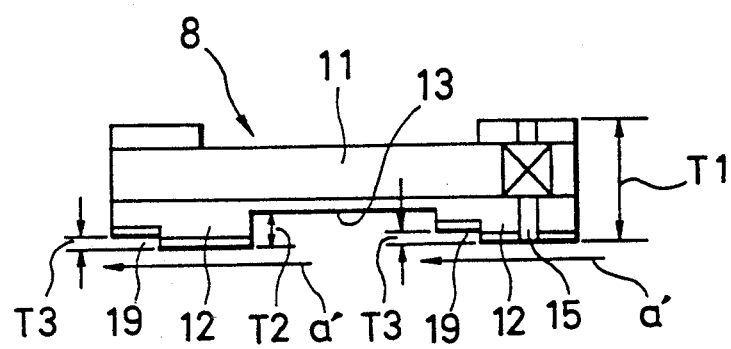
FIG. 6 is a view taken along line VI—VI of FIG. 5.
Figure 7:
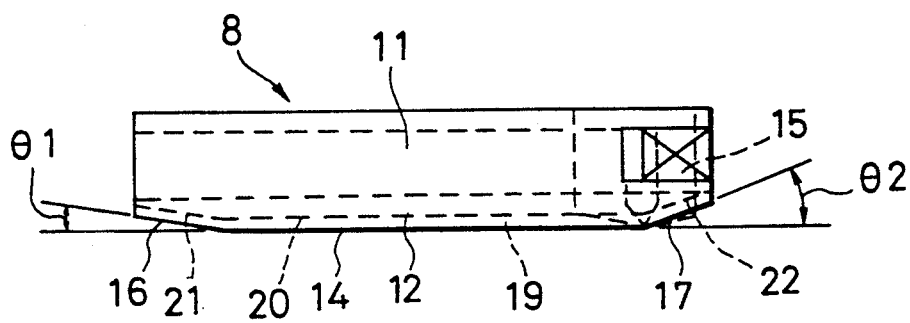
FIG. 7 is a view taken along line VII—VII of FIG. 5.

As shown in FIG. 5a, the slider body 11 has a width W1 of about 2 mm, a length L1 of about 2.5 mm, and a thickness T1 (FIG. 6) ranging from about 0.5 to 0.8 mm. The slider surfaces 14, 20 in each pair have a total width W2 ranging from about 0.7 to 0.9 mm. Each of the slider surfaces 20 has a width W3 ranging from about 0.2 to 0.3 mm. The slider groove 13 has a depth T2 of about 100 μm, and each of the control grooves 19 has a depth T3 ranging from about 2 to 5 μm. The slanted surfaces 16, 21 are inclined to the slider surfaces 14, 20 at an angle $\theta 1$ ranging from 0.5° to 0.8°. The slanted surfaces 17, 22 are inclined to the slider surfaces 14, 20 at an angle $\theta 2$ ranging from 1° to 2°.

Figure 1:
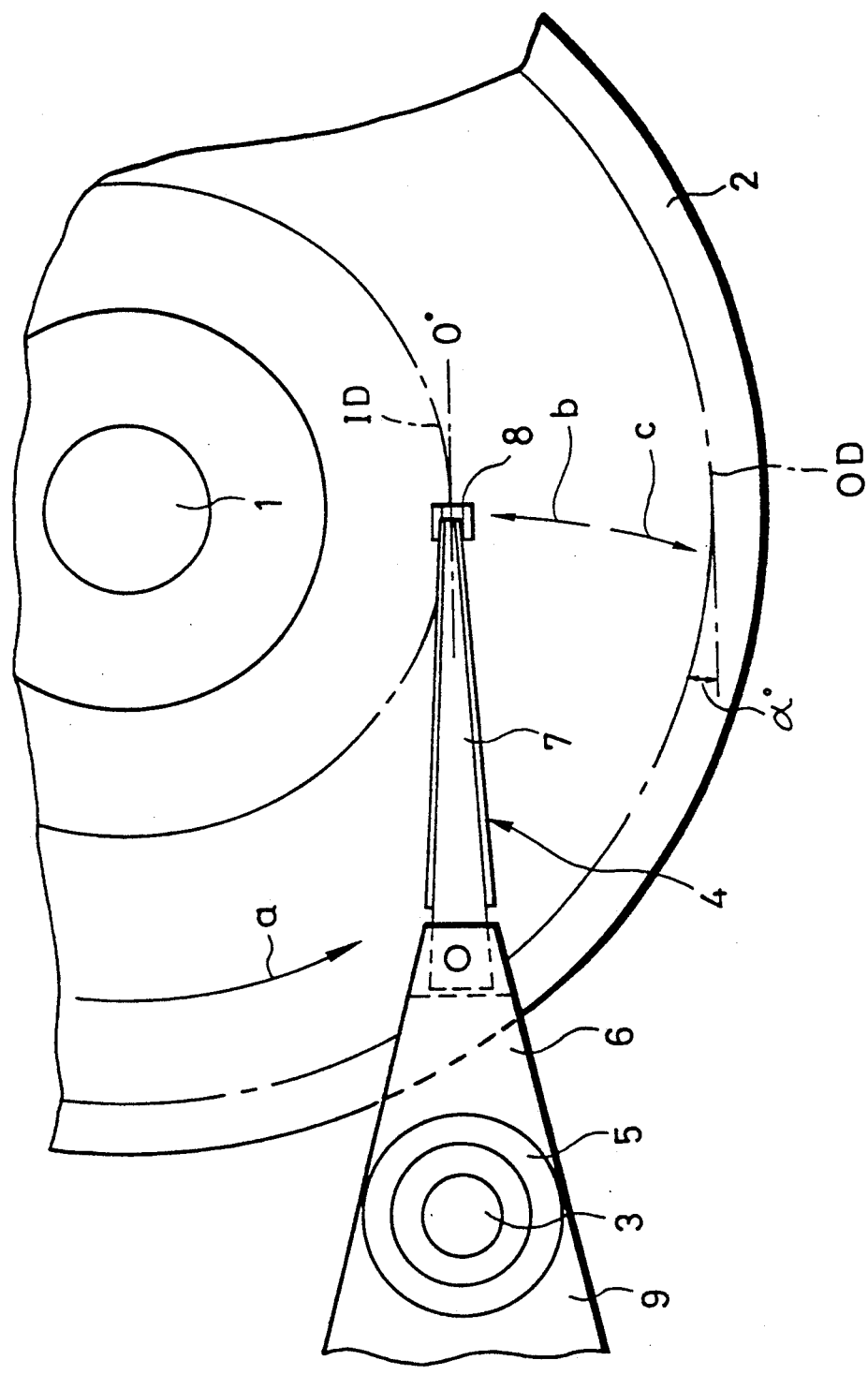
FIG. 1 is a fragmentary plan view of a hard disk drive.
Figure 2:
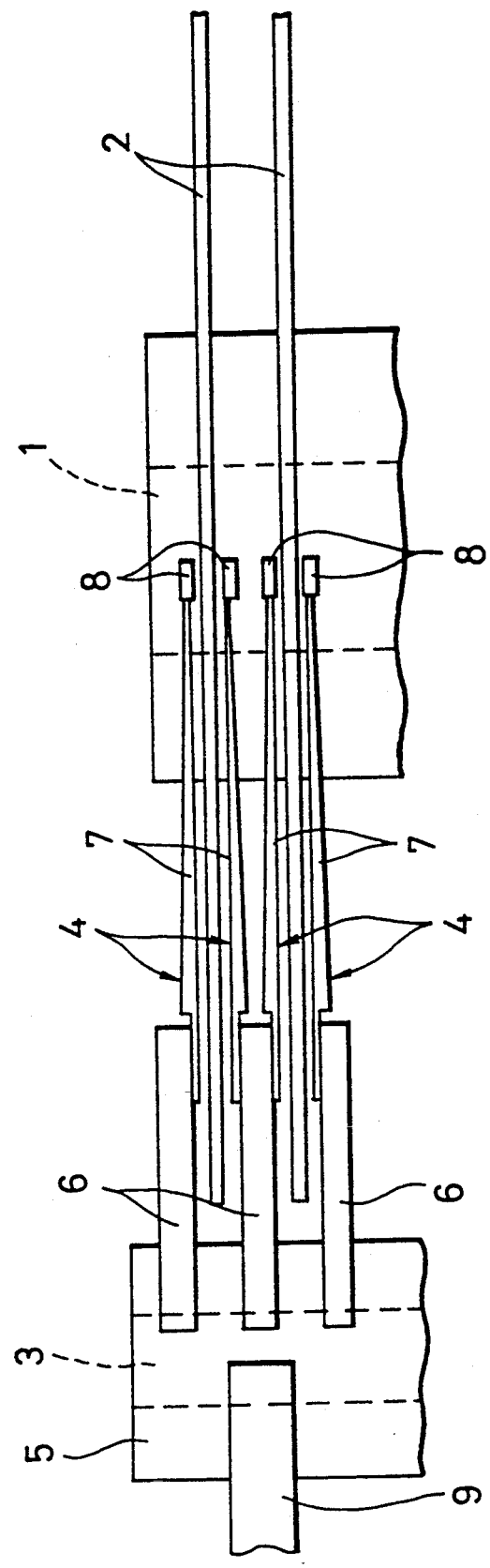
FIG. 2 is a fragmentary side elevational view of the hard disk drive shown in FIG. 1.
Figure 3:
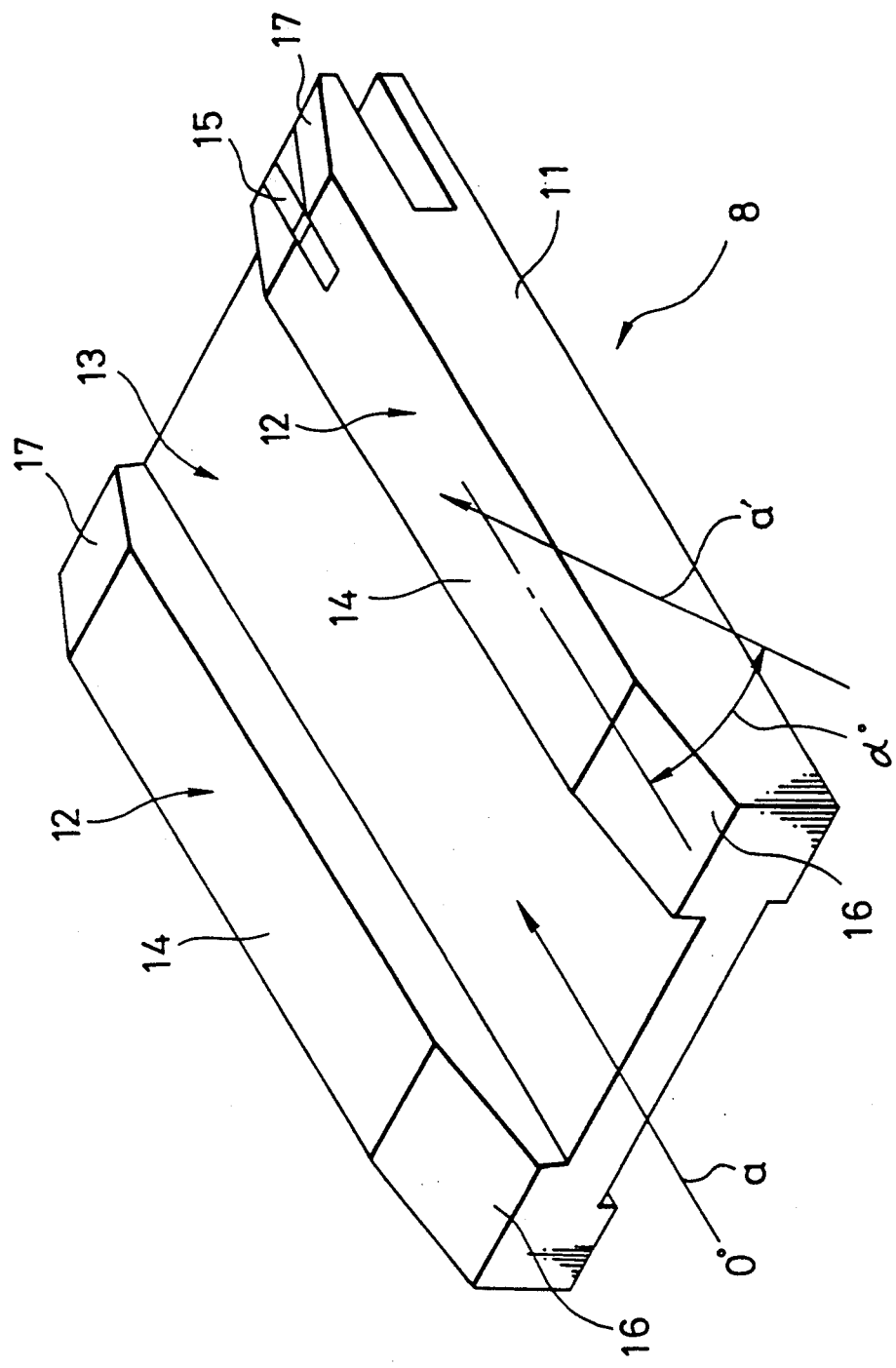
FIG. 3 is a perspective view of a conventional flying head slider.

When the flying head slider 8 according to the present invention is positioned at the radially innermost disk region ID of a hard disk 2 (see FIG. 1) with the yaw angle being 0°, the air flow which is generated when the hard disk 2 rotates at high speed is directed in the direction a parallel to the slider rails 12. A static pressure is developed on the slider surfaces 14, 20, with an atmospheric pressure applied in the slider groove 13.

Figure 5B:
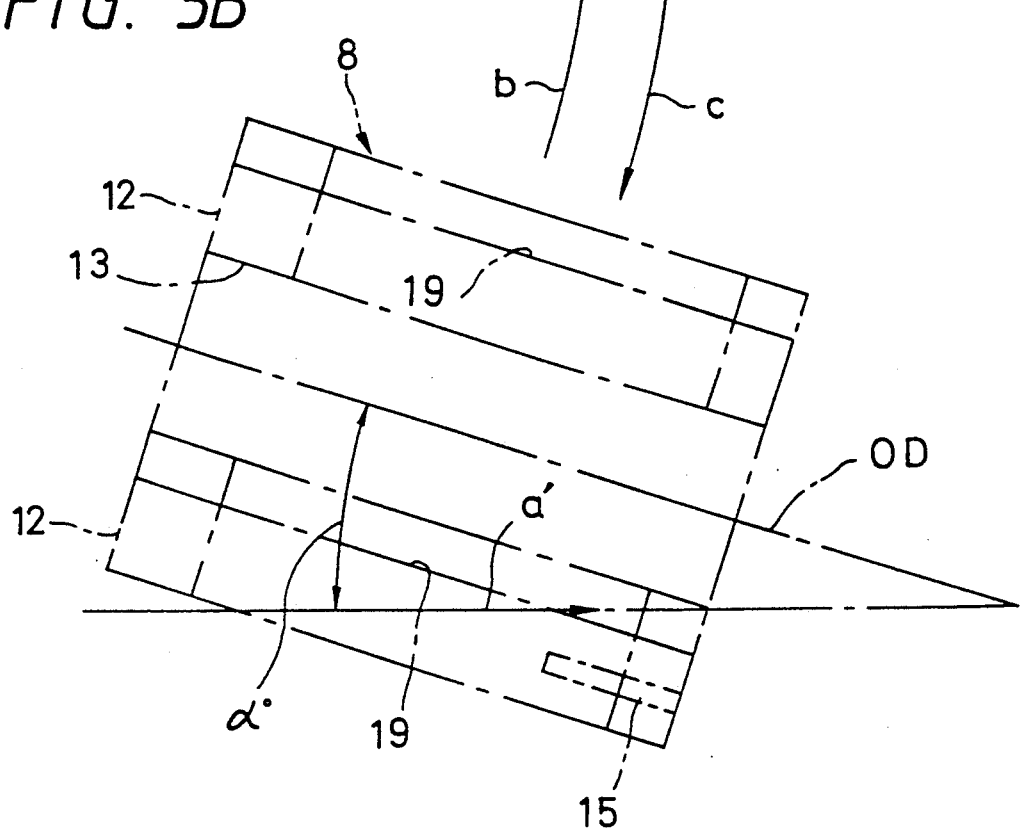

When the flying head slider 8 swings for accessing movement in the direction c from the radially innermost disk region ID toward the radially outermost disk region OD, the yaw angle progressively increases, and the direction of the air flow also progressively changes to the direction indicated by the arrow a' (see FIGS. 4 and 5b), developing a negative pressure in the control grooves 19. As the flying head slider 8 moves to the radially outermost disk region OD, the linear velocity of the air flow progressively increases, and so does the static pressure on the slider surfaces 14. However, the negative pressure in the control grooves 19 also increase in proportion to the linear velocity of the air flow.

Figure 8:
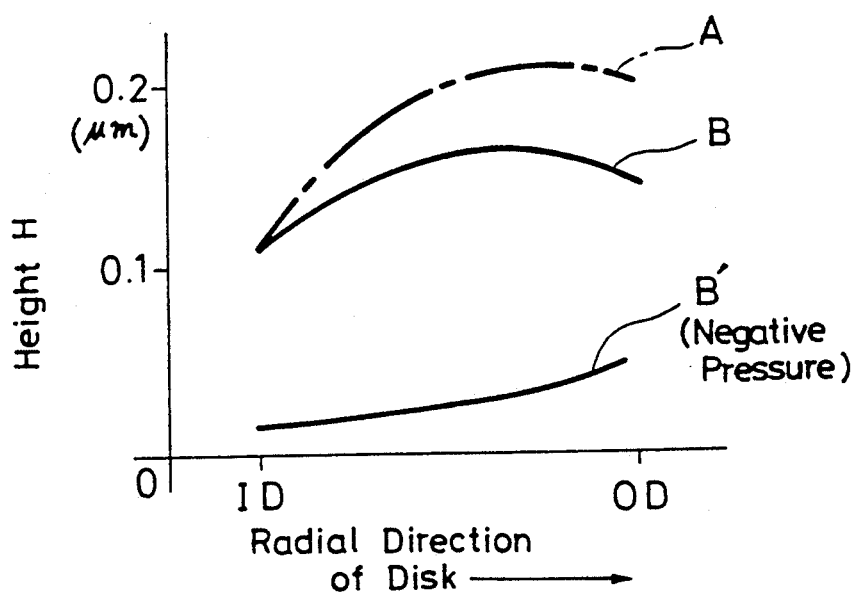
FIG. 8 is a graph showing distances or heights by which the flying head slider of the present invention and the conventional flying head slider float off hard disks.

Therefore, upon movement of the flying head slider 8 to the radially outermost disk region OD, the negative pressure in the control grooves 19 increases as indicated by the curve B' in FIG. 8. As a result, the increase, proportional to the linear velocity of the air flow, in the distance or height by which the flying head slider 8 floats off the hard disk 2 can be effectively reduced based on the change of the yaw angle from 0° to $a°$. Since the slider surfaces 14, 20 and the slanted surfaces 16, 17, 21, 22 lie parallel to each other, no air vortexes are produced in the control grooves 19.

The increase in the distance or height by which the flying head slider 8 of the invention floats off the hard disk 2 at the radially outermost disk region OD is reduced, as indicated by the curve B in FIG. 8, compared with the increase in the distance or height by which the conventional head slider floats off the hard disk at the radially outermost disk region, as indicated by the curve A. Specifically, the flying head slider 8 according to the present invention floats off the hard disk by a small distance or height H ranging from 0.1 to 0.15 ∥ m over a full disk surface range from the radially innermost disk region ID to the radially outermost disk region OD.

The negative pressure developed in the control grooves 19 serves to attract the flying head slider 8 strongly to the hard disk 2. Therefore, the flying head slider 8 remains stably floating off the hard disk 8 for protection against shocks and vibrations applied to the hard disk drive.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. In a flying head slider for supporting a magnetic head thereon in close proximity to a recording medium, the slider comprising a support structure having leading and trailing edges relative to the movement of said recording medium; a plurality of slider rails carried by said support structure and spaced from each other with a slider groove defined therebetween, one of said slider rails being adapted to support said magnetic head, and said slider rails exhibiting predetermined length and having respective slider surfaces facing said recording medium; and a plurality of control grooves disposed on one side of said slider rails, respectively, said control grooves being shallower than said slider groove, and said control grooves having groove surfaces facing said recording medium and extending parallel to said slider surfaces of said slider rails, the improvement wherein:

said slider surfaces are provided with slanted portions which taper away from the medium at said leading and trailing edges, said control grooves extend along the whole length of said slider rails including said slanted portions of said slider surfaces at both said leading and trailing edges, and said groove surfaces have slanted portions at said leading and trailing edges and lying parallel to said slanted portions of said slider surfaces.

* * * * *